United States Patent
Jin et al.

(10) Patent No.: US 9,236,807 B2
(45) Date of Patent: Jan. 12, 2016

(54) DC/DC CONVERTER, POWER CONVERTER AND CONTROL METHOD THEREOF

(75) Inventors: Hong-Yuan Jin, Shanghai (CN);
Pei-Qing Hu, Shanghai (CN);
Hong-Jian Gan, Shanghai (CN);
Jian-Ping Ying, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 148 days.

(21) Appl. No.: 13/427,450

(22) Filed: Mar. 22, 2012

(65) Prior Publication Data
US 2012/0250358 A1 Oct. 4, 2012

Related U.S. Application Data

(60) Provisional application No. 61/468,215, filed on Mar. 28, 2011.

(51) Int. Cl.
*H02M 3/335* (2006.01)
*H02M 1/00* (2007.01)

(52) U.S. Cl.
CPC .. *H02M 3/33569* (2013.01); *H02M 2001/0035* (2013.01); *H02M 2001/0058* (2013.01); *Y02B 70/1433* (2013.01); *Y02B 70/1491* (2013.01); *Y02B 70/16* (2013.01)

(58) Field of Classification Search
CPC ............ H02M 3/156; H02M 3/33507; H02M 3/33569; Y02B 70/126; Y02B 70/1433; Y02B 70/16
USPC .......... 363/15–17, 21.01–21.02, 21.04–21.11
See application file for complete search history.

(56) References Cited

U.S. PATENT DOCUMENTS 6,184,631 B1 * 2/2001 Noma et al. ................. 315/224
6,301,128 B1 * 10/2001 Jang ........................ H02J 5/005
363/127

(Continued)

FOREIGN PATENT DOCUMENTS

| CN | 1175551 C | 11/2004 |
|----|-----------|---------|
| CN | 1992493 A | 7/2007 |
| TW | M396538 U1 | 1/2011 |

OTHER PUBLICATIONS

"NCP1396A, NCP1396B, High Performance Resonant Mode Controller featuring High-Voltage Drivers", Semiconductor Components Industries, LLC, 2010, Nov. 2010, 1-25.

(Continued)

*Primary Examiner* — Adolf Berhane
*Assistant Examiner* — Henry Lee, III
(74) *Attorney, Agent, or Firm* — CKC & Partners Co., Ltd.

(57) ABSTRACT

A DC/DC converter, a power converter and a control method thereof are disclosed, where the DC/DC converter includes an output circuit, a rectangular wave generator, a resonant tank, a detection unit and a control unit. The output circuit has a load. The rectangular wave generator converts an input voltage into at least one rectangular wave. The resonant tank provides a first voltage based on the rectangular wave for the output circuit. The detection unit detects a signal related to a state of the load. When the state of the load is light-load or a no-load, the control unit controls a working frequency or a duty ratio of the rectangular wave, so that the duty ratio of the rectangular wave is within a predetermined range, in which a voltage gain of the DC/DC converter is greater than another voltage gain under the condition of 50% duty ratio.

24 Claims, 6 Drawing Sheets

(56) References Cited

U.S. PATENT DOCUMENTS

| | | |
|---|---|---|
| 2007/0297198 A1 | 12/2007 | Chang |
| 2008/0117655 A1* | 5/2008 | Meszlenyi ........ H02M 3/33507 363/21.12 |
| 2008/0130322 A1 | 6/2008 | Artusi et al. |
| 2008/0197817 A1* | 8/2008 | Colbeck .............. H02M 1/4225 323/205 |
| 2010/0202170 A1 | 8/2010 | Kim et al. |
| 2011/0085354 A1* | 4/2011 | Wang .................. H02M 1/4225 363/21.02 |

OTHER PUBLICATIONS

"NCP1608, Critical Conduction Mode PFC Controller Utilizing a Transconducrance Error Amplifier", Semiconductor Components Industries, LLC, 2010, Jun. 2010, 1-24.

* cited by examiner (A)

(B)

DC/DC CONVERTER, POWER CONVERTER AND CONTROL METHOD THEREOF

RELATED APPLICATIONS

This application claims priority to U.S. Provisional Application Ser. No. 61/468,215, filed Mar. 28, 2011, which is herein incorporated by reference.

BACKGROUND

1. Technical Field

The present disclosure relates to power electronic, and more particularly, a power converter and a control method thereof.

2. Description of Related Art

In recent years, with the fast development of the energy conservation technology, more and more customers desire that a switching-mode converter can achieve high conversion efficiency in a wide load range, so improving the efficiency of this converter in a light-load or a no-load is also very important. In this regard, the International Energy Agency (IEA), the United States and Europe and other countries and organizations have been established or are establishing standards to limit a loss of the switching-mode converter in the light-load and the no-load.

By using resonant converter technology, a series resonant DC/DC converter can realize zero voltage switching, and therefore power loss is very small, and power converter efficiency in full-load is high. FIG. 1 is a block diagram of a LLC series resonant DC/DC converter. This topology is commonly based on a frequency modulation mode to stabilize the output voltage by changing the frequency of rectangular waves, in which the duty ratio is 50%, as shown in FIG. 2. The relationship between the power output-voltage gain M and a working frequency is:

$$M = \frac{2n * V_o}{V_{in}} = \frac{1}{\sqrt{\left\{1 + \frac{L_s}{L_m}\left[1-\left(\frac{f_s}{f}\right)^2\right]\right\}^2 + Q^2\left(\frac{f}{f_s} - \frac{f_s}{f}\right)^2}},$$

wherein, the resonance frequency $$f_s = \frac{1}{2\pi\sqrt{C_s * L_s}}, Q = \frac{2\pi f_s L_s}{\frac{8}{\pi^2}n^2 R_L},$$

wherein Ls is a resonant inductance value, Lm is a magnetizing inductance value, Cs is a resonant capacitance value, f is the working frequency of the rectangular wave, n is a turns ratio of a transformer, and $R_L$, is a resistance value of the output load.

As shown in FIG. 3, the working method in the light-load as follows: detecting a state of the load, and controlling the series resonant converter to increase the working frequency of the rectangular wave as the load is decreased; when the working frequency achieves a predetermined value, the working frequency is maintained at this value, and this converter operates in an intermittent control mode (i.e., a hiccup mode).

There are two methods of improving the efficiency in the light-load as follows:
1. Reducing the working frequency of the converter. Because switching losses and driver losses in power devices account for a large proportion of losses in light-load, so reducing the switching frequency can effectively reduce these losses, thus reducing the light-load losses, which applies to PWM (Pulse Width Modulation) circuit.
2. Controlling the converter operates in an intermittent mode. By detecting a voltage error amplifier signal, the converter which is in light-load works in an intermittent mode, so as to reduce the on-off times of the converter switch per unit time, and thereby reducing standby losses.

In the resonant circuit, only reducing the working frequency cannot effectively control the output voltage, and therefore the above first method cannot be implemented. Above second method may improve the efficiency in the light-load to a certain extent, but when the working frequency of the converter is higher, the gain is less than 1, as shown in FIG. 4. Therefore, in each work cycle, transmission energy is lower; thus the on-off times of the converter switch is higher, and excessive switching loss and driving loss per unit time are also higher. Thus, the second method cannot reach the limit on the light-load loss.

In view of the foregoing, there is an urgent need in the related field to provide a way to improve the efficiency in the light-load more efficiently.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

In one or more various aspects, the present disclosure is directed to a power converter and a method of controlling the power converter to meet the requirements for high efficiency in the light-load.

According to one embodiment of the present invention, a DC/DC converter includes an output circuit, a rectangular wave generator, a resonant tank, a detection unit and a control unit. The output circuit has a load. The rectangular wave generator converts an input voltage into at least one rectangular wave. The resonant tank provides a first voltage based on the rectangular wave for the output circuit. The detection unit detects a signal related to a state of the load. The control unit controls a working frequency or a duty ratio of the rectangular wave, so that when the state of the load is a light-load or a no-load, the duty ratio of the rectangular wave is within a predetermined range, in which a voltage gain of the DC/DC converter is greater than another voltage gain under the condition of 50% duty ratio.

When the state of the load is the light-load or the no-load, the control unit controls the rectangular wave generator in a hiccup mode, and the working frequency of the rectangular wave is higher than a resonance frequency of the resonant tank.

When the state of the load is the heavy-load or the full-load, the control unit controls the rectangular wave generator in a frequency modulation mode.

The rectangular wave generator includes a switch, and the control unit controls an on/off state of the switch to output the rectangular wave, wherein amplitude of the rectangular wave is equal to the input voltage or the double of the input voltage.

The switch is a half-bridge circuit or a full-bridge circuit.

The load includes a resistor.

The output circuit further includes a transformer and a rectifier both electrically connected to the resistor.

The resonant tank is a serial resonant circuit or a parallel resonant circuit.

The serial resonant circuit is a LC series resonant circuit or a LLC series resonant circuit.

The LLC series resonant circuit includes a magnetizing inductor, a resonant inductor and a resonant capacitor connected to each other in series, wherein the magnetizing inductor and the output circuit are connected in parallel.

The duty ratio is less than 0.5 and greater than a lower limit value of the predetermined range, so that when the resonant capacitor charges, the voltage gain of the DC/DC converter is greater than said another voltage gain under the condition of 50% duty ratio.

Alternatively, the duty ratio is greater than 0.5 and less than an upper limit value of the predetermined range, so that when the resonant capacitor discharges, the voltage gain of the DC/DC converter is greater than said another voltage gain under the condition of 50% duty ratio.

According to another embodiment of the present invention, a power converter includes above DC/DC converter, a power factor correction device and an electromagnetic interference filter. The power factor correction device is electrically coupled with the DC/DC converter. The electromagnetic interference filter is electrically coupled with the power factor correction device for receiving alternating current, wherein the electromagnetic interference filter and the power factor correction device convert the alternating current into the input voltage and provide the input voltage for the DC/DC converter.

When the state of the load is the light-load or the no-load, the power factor correction device reduces the input voltage provided for the DC/DC converter.

When the state of the load is the light-load or the no-load, the power factor correction device is turned off.

The power factor correction device includes a bridge rectifier and a power factor corrector. The power factor corrector is electrically coupled with the bridge rectifier.

The power factor correction device includes a bridgeless power factor corrector.

According to yet another embodiment of the present invention, a method of controlling the power converter includes following steps: converting an input voltage into at least one rectangular wave; providing a first voltage based on the rectangular wave for an output circuit; detecting a signal related to a state of the load; and when the state of the load is a light-load or a no-load, controlling a working frequency or a duty ratio of the rectangular wave, so that the duty ratio of the rectangular wave is within a predetermined range, in which a voltage gain is greater than another voltage gain under the condition of 50% duty ratio.

When the state of the load is the light-load or the no-load, the method further includes a step of controlling the rectangular wave in a hiccup mode, and another step of controlling the working frequency of the rectangular wave to be higher than a resonance frequency.

The method further includes a step of modulating the rectangular wave in a frequency modulation mode when the state of the load is the heavy-load or the full-load.

The step of transforming the input voltage into the rectangular wave includes: controlling an on/off state of a switch to output the rectangular wave, wherein amplitude of the rectangular wave is equal to the input voltage or the double of the input voltage.

The method further includes a step of configuring an electromagnetic interference filter to receive alternating current, wherein the electromagnetic interference filter and a power factor correction device can convert the alternating current into the input voltage and provide the input voltage.

When the state of the load is the light-load or the no-load, the input voltage provided from the power factor correction device is reduced.

When the state of the load is the light-load or the no-load, the power factor correction device is turned off.

Technical advantages are generally achieved, by embodiments of the present invention, as follows: because the duty ratio of the rectangular wave is within a predetermined range, in which a voltage gain is greater than another voltage gain under the condition of 50% duty ratio, the on-off times of the converter switch per unit time is reduced more efficiently and the efficiency in the light-load is improved, so as to meet the requirements for high efficiency in the light-load.

Many of the attendant features will be more readily appreciated, as the same becomes better understood by reference to the following detailed description considered in connection with the accompanying drawings.

BRIEF DESCRIPTION OF THE DRAWINGS

The present description will be better understood from the following detailed description read in light of the accompanying drawing, wherein.

DETAILED DESCRIPTION

Figure 1:
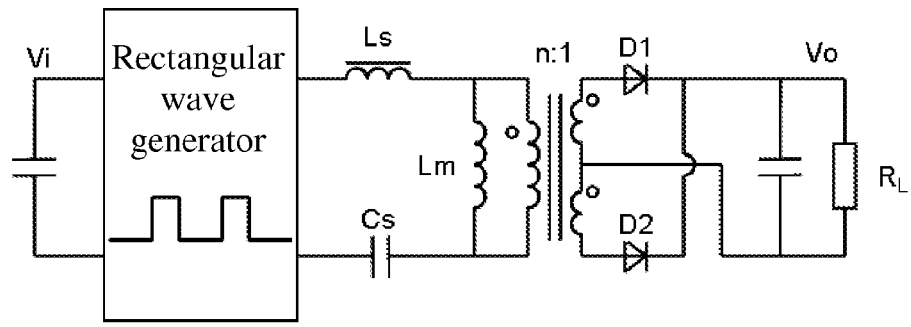
FIG. 1 is a block diagram of a LLC series resonant DC/DC converter.
Figure 2:
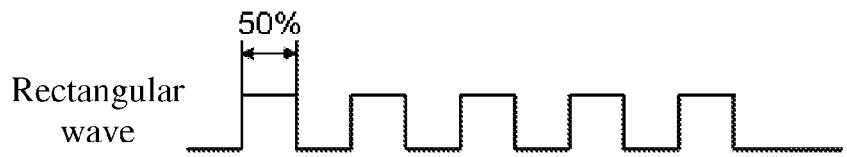
FIG. 2 is a conventional driving waveform of a rectangular wave generator of FIG. 1.
Figure 3:
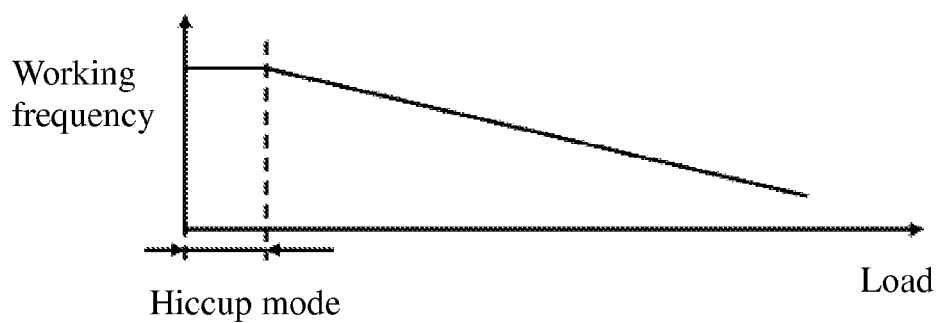
FIG. 3 illustrates a conventional method of controlling the LLC series resonant DC/DC converter of FIG. 1.
Figure 4:
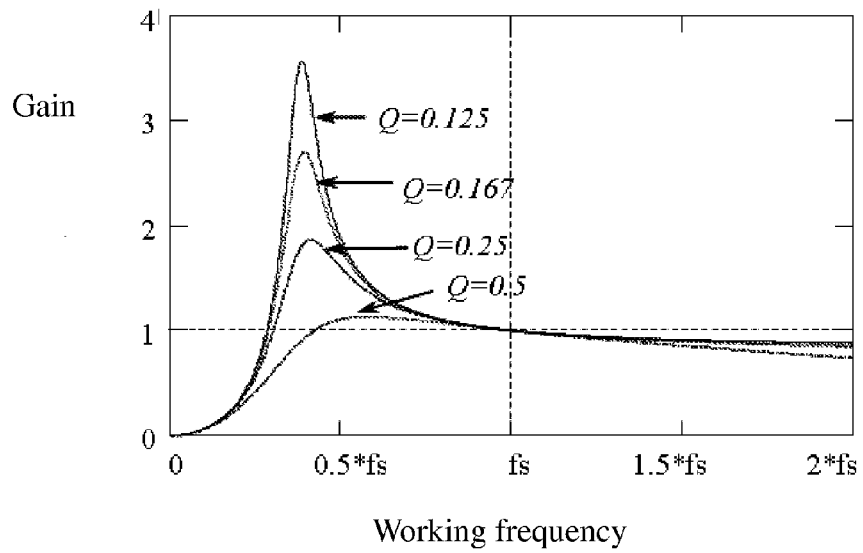
FIG. 4 shows a gain curve of the LLC series resonant DC/DC converter according to the conventional method.

In the following detailed description, for purposes of explanation, numerous specific details are set forth in order to attain a thorough understanding of the disclosed embodiments. It will be apparent, however, that one or more embodiments may be practiced without these specific details. In other instances, well-known structures and devices are schematically shown in order to simplify the drawing.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 5:
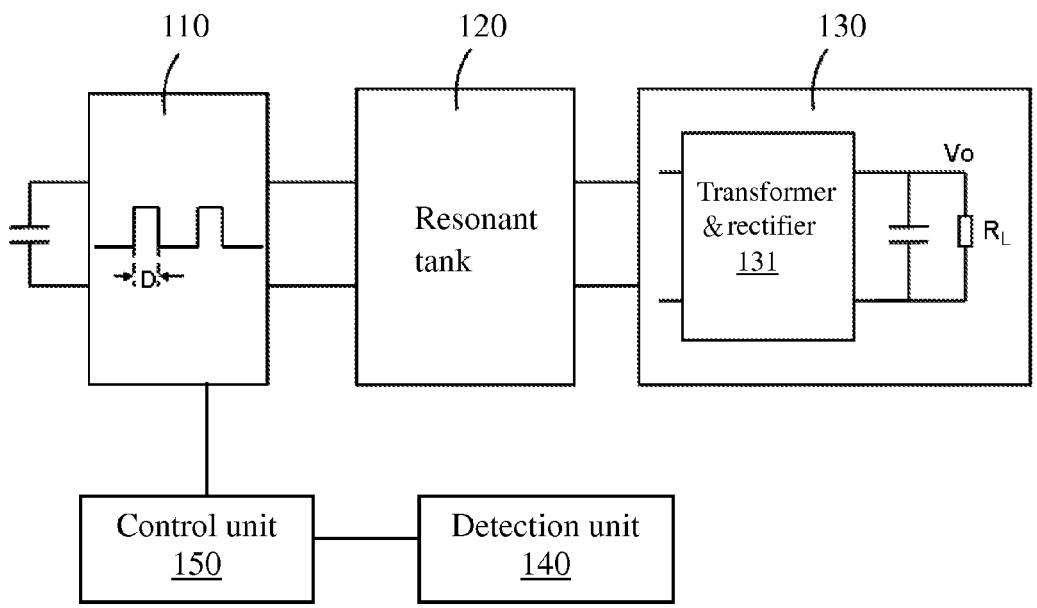
FIG. 5 is a block diagram of a DC/DC converter according to one embodiment of the present disclosure.

In one or more various aspects, the present invention is directed to meet the requirements for high efficiency in the light-load. Referring to FIG. 5, illustrated is a block diagram of a DC/DC converter 100 according to one embodiment of the present disclosure. This converter may be easily inserted into a power converter, and may be applicable or readily adaptable to all related technology.

The DC/DC converter 100 includes a rectangular wave generator 110, a resonant tank 120, an output circuit 130, a detection unit 140 and a control unit 150. The rectangular wave generator 110 is electrically coupled with the resonant tank 120. The resonant tank 120 is electrically coupled with the output circuit 130. The output circuit 130 is electrically coupled with the detection unit 140. The detection unit 140 is electrically coupled with the control unit 150. The control unit 150 is electrically coupled with the rectangular wave generator 110.

Figure 6:
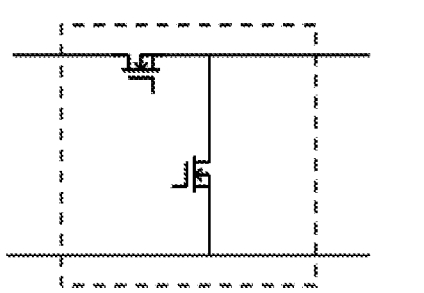
FIG. 6 is a circuit diagram of a rectangular wave generator according to one embodiment of the present disclosure.
Figure 6:
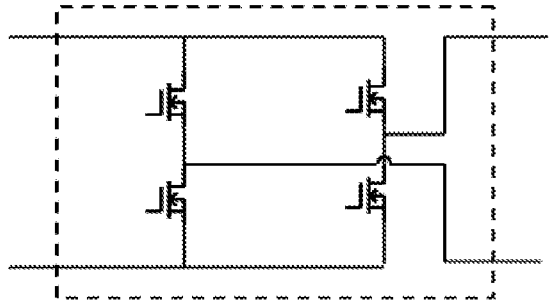

The rectangular wave generator 110 includes one or more switches, such as half-bridge circuit (A) or a full-bridge circuit (B) in FIG. 6. The control unit 150 controls an on/off state of the switch to output the rectangular wave, wherein amplitude of the rectangular wave is equal to the input voltage, where D represents the duty ratio of the rectangular wave, and f represents the frequency of the rectangular wave. Alternatively, in another embodiment, the amplitude of the rectangular wave is the double of the input voltage. Those with ordinary skill in the art may set the amplitude of the rectangular wave depending on the desired application.

Figure 7:
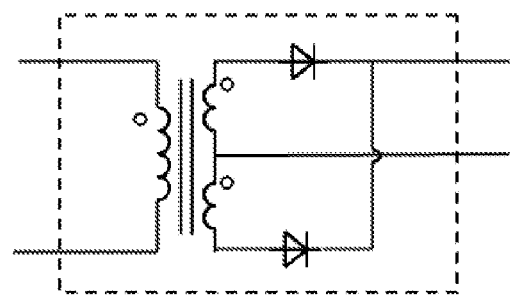
FIG. 7 is a circuit diagram of a transformer and a rectifier according to one embodiment of the present disclosure.
Figure 7:
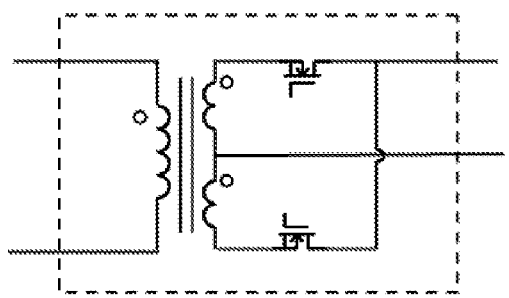
Figure 7:
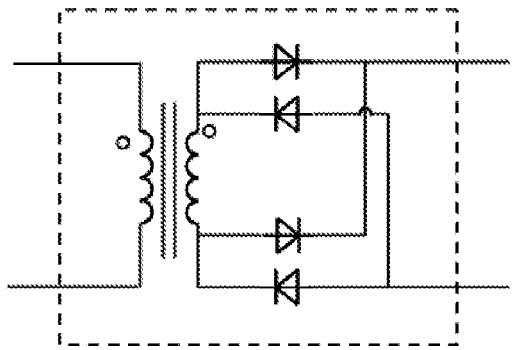
Figure 7:
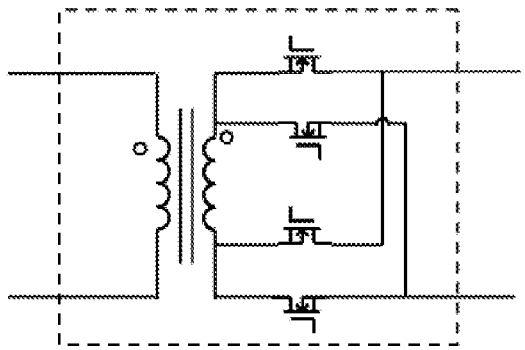

The output circuit 130 has a load $R_L$, such as a resistor. Alternatively, the output circuit 130 includes a transformer with a rectifier 131, and the load $R_L$, wherein the transformer and the rectifier 131 both electrically connected to the resistor. The rectifier may be a full-wave rectifier, a center-tapped rectifier, a diode rectifier, a synchronous rectifier, or the combination thereof, as shown in FIG. 7.

The resonant tank 120 may be a series resonant circuit, such as a LC series resonant circuit, a LLC series resonant circuit or the like, or a parallel resonant circuit. The output circuit 130 and one or more resonant devices of the resonant tank 120 are connected in parallel or series.

The control unit 150 may be hardware, software, and/or firmware. For example, if speed and accuracy are specific concerns, the control unit 150 may opt for a mainly hardware and/or firmware; alternatively, if flexibility is specific concerns, the control unit 150 may opt for a mainly software implementation; or, yet again alternatively, the control unit 150 may opt for some combination of hardware, software, and/or firmware. Hence, there are several possible implementation way by which the processes and/or devices and/or other technologies described herein may be effected, none of which is inherently superior to the other in that any implementation way to be utilized is a choice dependent upon the context in which the implementation way will be deployed and the specific concerns (e.g., speed, flexibility, or predictability), any of which may vary.

Figure 11:
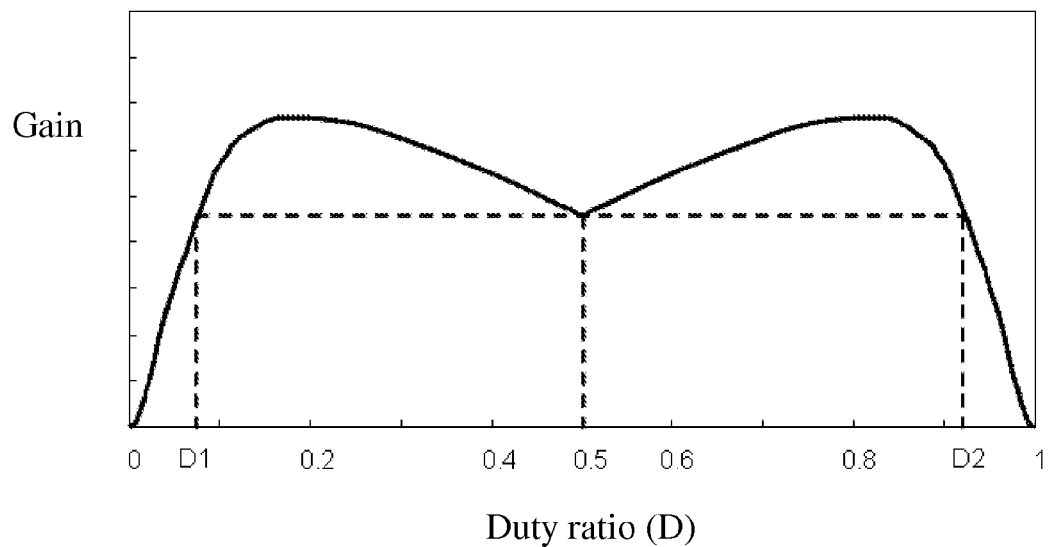
FIG. 11 illustrates a gain curve of a method of controlling the LLC series resonant circuit according to one embodiment of the present disclosure.

When the DC/DC converter 100 operates, the rectangular wave generator 110 converts an input voltage into at least one rectangular wave. The resonant tank 120 provides a first voltage based on the rectangular wave for the output circuit 130. The detection unit 140 detects a signal related to a state of the load $R_L$; for example, this signal may be a current signal of the primary side of the transformer, a current signal of the secondary side of the transformer, a current signal through the resonant inductor $L_s$ of the resonant tank 120, a voltage of the resonant capacitor $C_s$ or the like. When the state of the load is a light-load or a no-load, the control unit 150 controls the rectangular wave generator 110 in a hiccup mode, and the working frequency of the rectangular wave is higher than a resonance frequency of the resonant tank 120, and the duty ratio of the rectangular wave is within a predetermined range (i.e., 0.5>D>the lower limit value D1 or 0.5<D<the upper limit value D2), in which a voltage gain of the DC/DC converter 100 is greater than another voltage gain under the condition of 50% duty ratio, as shown in FIG. 11.

Furthermore, when the state of the load is the heavy-load or the full-load, the control unit 150 controls the rectangular wave generator 110 in a frequency modulation mode. In the frequency modulation mode, the output voltage is stabilized by changing the frequency of rectangular waves, so as to meet the requirements for high efficiency in the heavy-load.

The primary control method of the present invention is to change the duty ratio D of the rectangular waves generated by the rectangular wave generator 110 when the state of circuitry works in the light-load, so as to increase the circuitry gain.

This high-gain control method can improve the efficiency of the converter. When the circuitry works in the high-gain, the input voltage can be reduced, and the conversion efficiency of the forestage converter can be increased; therefore the converter's overall efficiency can be improved. When the circuitry works in the high-gain and intermittent working mode (i.e., a hiccup mode), the on/off times of the converter switch can be reduced efficiently and the working efficiency of the converter can be improved.

Figure 8:
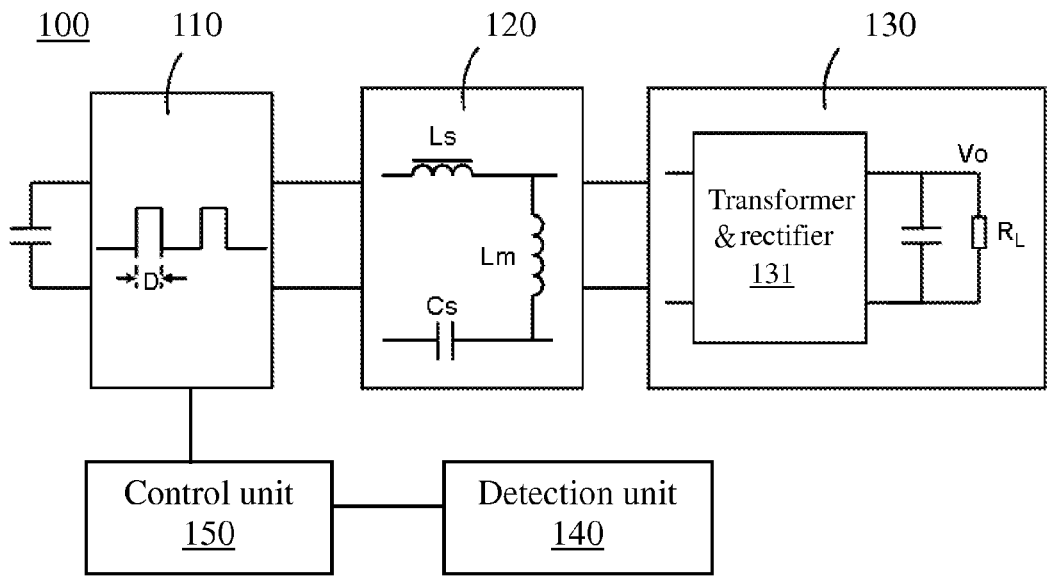
FIG. 8 shows circuit blocks of a LLC series resonant circuit according to one embodiment of the present disclosure.

Referring to FIG. 8, illustrated is circuit blocks of a LLC series resonant circuit according to one embodiment of the present disclosure, in which a magnetizing inductor $L_m$, a resonant inductor $L_s$ and a resonant capacitor $C_s$ are connected to each other in series, wherein the magnetizing inductor $L_m$ and the output circuit 130 are connected in parallel.

When the circuitry works in the light-load, the working frequency of the circuitry, i.e., the frequency f of the rectangular wave generated by the rectangular wave generator 110, is higher than resonant frequency $f_s$ generated by a serial resonator composed of $L_s$ and $C_s$. Because the ripple of the voltage of the resonant capacitor $C_s$ is very small, the voltage of the resonant capacitor $C_s$ is approximately equal to the product of the duty ratio and the input voltage, i.e., $D \times V_i$.

When D=0.5, the voltage of the resonant capacitor $C_s$ is $D \times V_i = V_i/2$. The total voltage of the magnetizing inductor $L_m$ and the resonant inductor $L_s$ is $(1-D) \times V_i = V_i/2$.

Figure 9:
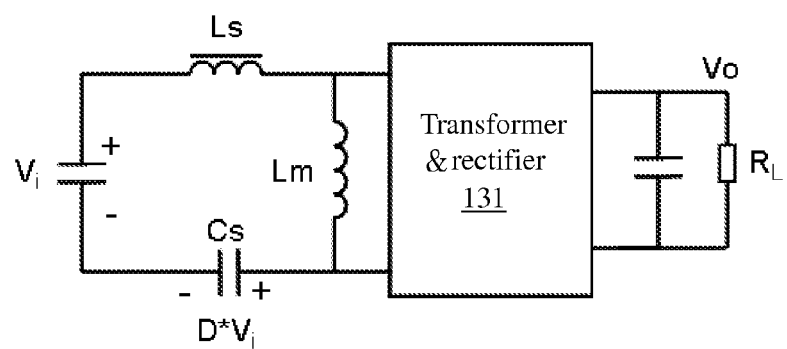
FIG. 9 is an equivalent-circuit diagram of FIG. 8 when a resonant capacitor Cs charges.

When D<0.5, the voltage of the resonant capacitor $C_s$ is $D \times V_i$, and when the resonant capacitor $C_s$ charges, the equivalent-circuit is illustrated in FIG. 9. The total voltage of the magnetizing inductor $L_m$ and the resonant inductor $L_s$ is $(1-D) \times V_i > V_i/2$.

Figure 10:
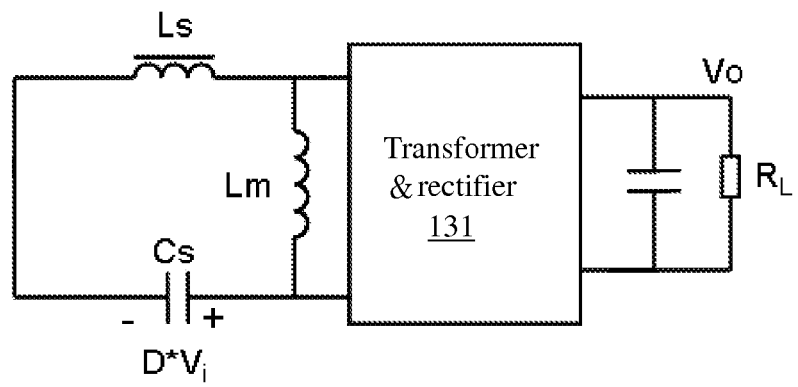
FIG. 10 is an equivalent-circuit diagram of FIG. 8 when the resonant capacitor Cs discharges.

When D>0.5, the voltage of the resonant capacitor $C_s$ is $D \times V_i$, and when the resonant capacitor $C_s$ discharges, the equivalent-circuit is illustrated in FIG. 10. The total voltage of the magnetizing inductor $L_m$ and the resonant inductor $L_s$ is $D \times V_i > V_i/2$.

Since the output circuit 130 and the magnetizing inductor $L_m$ are connected in parallel, the output circuit 130 can obtain higher voltage when the light-load and D≠0.5; in another word, a voltage gain of the circuitry when the light-load and D≠0.5 is greater than another voltage gain when D=0.5.

FIG. 11 shows a relation curve between the gain and the duty ratio D according to one embodiment of the present disclosure. When the duty ratio D of the rectangular wave is within above predetermined range (i.e., 0.5>D>the lower limit value D1 or 0.5<D<the upper limit value D2), the gain of the circuitry is greater than another voltage gain under the condition of D=0.5. It should be noted that the lower limit value D1 and the upper limit value D2 are not constant values, and depend on the load $R_L$ and resonant parameters.

Referring to FIGS. 9 and 11, the duty ratio D is less than 0.5 and greater than a lower limit value D1 of the predetermined range, so that when the resonant capacitor $C_s$ charges, the voltage gain of the DC/DC converter is greater than said another voltage gain under the condition of 50% duty ratio.

Turning to FIGS. 10 and 11, the duty ratio D is greater than 0.5 and less than an upper limit value D2 of the predetermined range, so that when the resonant capacitor $C_s$ discharges, the voltage gain of the DC/DC converter is greater than said another voltage gain under the condition of 50% duty ratio.

Figure 12:
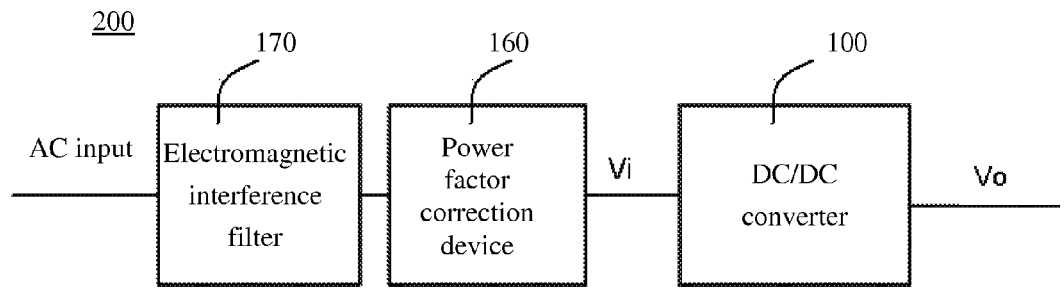
FIG. 12 is a block diagram of a power converter according to one embodiment of the present disclosure.

This high-gain control method can be easily inserted into a switching power source for improving the efficiency in the light-load. Referring to FIG. 12, illustrated is a block diagram of a power converter 200 according to one embodiment of the present disclosure. The power converter 200 includes above DC/DC converter 100, a power factor correction device 160 and an electromagnetic interference filter 170. The power factor correction device 160 is electrically coupled with the DC/DC converter 100. The electromagnetic interference filter 170 is electrically coupled with the power factor correction device 160. In use, the electromagnetic interference filter 170 receives alternating current, and the electromagnetic interference filter 170 and the power factor correction device 160 convert the alternating current into the input voltage and provide the input voltage $V_i$ for the DC/DC converter 100.

Figure 13:
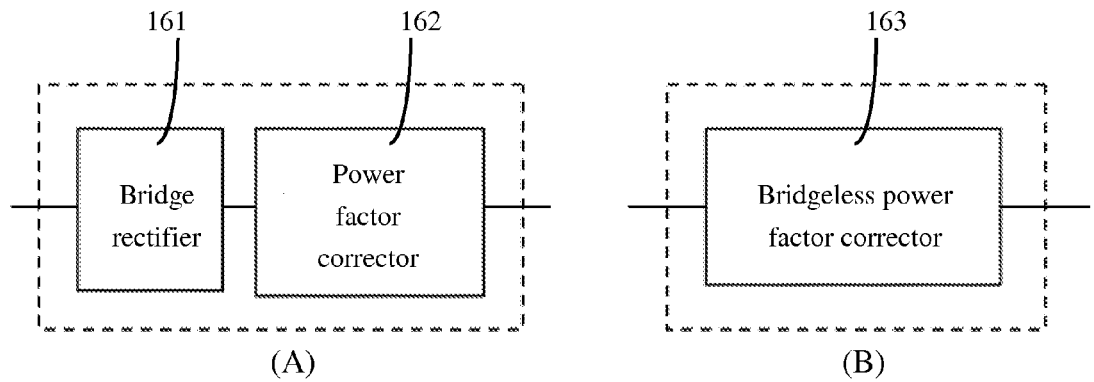
FIG. 13 is a block diagram of a power factor correction device according to one embodiment of the present disclosure.

As shown in FIG. 13, (A) the power factor correction device 160 includes a bridge rectifier 161 and a power factor corrector 162, wherein the power factor corrector 161 is electrically coupled with the bridge rectifier 162; alternatively, (B) the power factor correction device 160 includes a bridgeless power factor corrector 163.

The control strategy 1: when the state of the load is the heavy-load, the converter works in a frequency modulation mode (i.e., PFM mode) to meet the requirements for high efficiency in the heavy-load. When the state of the load is the light-load, the converter works in a high-gain mode and utilizes the intermittent working mode (i.e., hiccup mode) to stabilize the output voltage, and thereby improving the efficiency in the light-load.

The control strategy 2: when the state of the load is the heavy-load, the converter works in the frequency modulation mode (i.e., PFM mode) to meet the requirements for high efficiency in the heavy-load. When the state of the load is the light-load, the converter works in the high-gain mode, utilizes the intermittent working mode to stabilize the output voltage, and meanwhile reduce the output voltage of the power factor correction device 160; for example, using the control unit 150 to decrease the output voltage of the power factor correction device 160 for increasing the efficiency of the power factor correction device 160, and thereby improving the efficiency in the light-load. Furthermore, the efficiency of both of the power factor correction device 160 and the DC/DC converter 100 in the light-load can be increased, so as to increase the efficiency in the light-load.

The control strategy 3: when the state of the load is the heavy-load, the converter works in the frequency modulation mode (i.e., PFM mode) to meet the requirements for high efficiency in the heavy-load. When the state of the load is the light-load, the converter works in the high-gain mode, utilizes the intermittent working mode to stabilize the output voltage, and meanwhile when the input alternating current voltage is high, turns off the power factor correction device 160; for example, the control unit 150 turns off the power factor correction device 160. When input alternating current voltage is low, the output voltage of the power factor correction device 160 is decreased for increasing the efficiency of the power factor correction device 160, and thereby improving the efficiency in the light-load.

In another aspect, a method of controlling the power converter 200 according to one or more embodiments is disclosed herein. The method includes following steps: (a) converting an input voltage into at least one rectangular wave; (b) providing a first voltage based on the rectangular wave for the output circuit 130; (c) detecting a signal related to a state of the load $R_L$; (d) when the state of the load $R_L$ is a light-load or a no-load, controlling the rectangular wave in a hiccup mode, so that a working frequency f of the rectangular wave is higher than a resonant frequency $f_s$ and the duty ratio D of the rectangular wave is within a predetermined range (i.e., 0.5>D>the lower limit value D1 or 0.5<D<the upper limit value D2), in which a voltage gain is greater than another voltage gain under the condition of 50% duty ratio.

The steps are not recited in the sequence in which the steps are performed. That is, unless the sequence of the steps is expressly indicated, the sequence of the steps is interchangeable, and all or part of the steps may be simultaneously, partially simultaneously, or sequentially performed. It should be noted that those implements to perform the steps in the method are disclosed in above embodiments and, thus, are not repeated herein.

In this method, when the state of the load is the heavy-load or the full-load, the rectangular wave based on a frequency modulation mode is modulated.

The step of transforming the input voltage into at least one rectangular wave includes: controlling an on/off state of a switch to output the rectangular wave, wherein amplitude of the rectangular wave is equal to the input voltage or the double of the input voltage.

This method further includes a step of configuring an electromagnetic interference filter 170 to receive alternating current, wherein the electromagnetic interference filter 170 and a power factor correction device 160 can convert the alternating current into the input voltage and provides the input voltage $V_i$.

When the state of the load $R_L$, is the light-load or the no-load, the input voltage $V_i$ provided from the power factor correction device 160 is reduced.

Alternatively, when the state of the load $R_L$, is the light-load or the no-load, the power factor correction device 160 is turned off.

In view of the above, when the state of the load $R_L$, is the light-load or the no-load, the power converter operates in the hiccup mode and the duty of the rectangular wave is not 50%, wherein the working frequency f is higher than the resonance frequency $f_s$, but the voltage gain is greater than said another voltage gain under the condition of 50% duty ratio. Thus, the on-off times of the converter switch per unit time is reduced more efficiently and the efficiency in the light-load is improved, so as to meet the requirements for high efficiency in the light-load.

The reader's attention is directed to all papers and documents which are filed concurrently with his specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, 6th paragraph. In particular, the use of "step of" in the claims herein is not intended to invoke the provisions of 35 U.S.C. §112, 6th paragraph.

What is claimed is:

1. A DC/DC converter comprising:
   an output circuit having a load;
   a rectangular wave generator comprising switches for converting an input direct current (DC) voltage into at least one rectangular wave;
   a resonant tank for providing a first voltage based on the rectangular wave for the output circuit;
   a detection unit for detecting a signal related to a state of the load; and
   a control unit outputs control signals to the switches of the rectangular wave generator for controlling a duty ratio of the rectangular wave outputted by the rectangular wave generator, so that when the state of the load is a light-load or a no-load, the control signals control the switches of the rectangular wave generator to make the rectangular wave generator work in a hiccup mode, and the duty ratio of the rectangular wave is within a predetermined range, in which a voltage gain of the DC/DC converter is greater than another voltage gain under the condition of 50% duty ratio for reduction in the on-off times of the switches of the rectangular wave generator per unit time.

2. The DC/DC converter of claim 1, wherein when the state of the load is the light-load or the no-load, a working frequency of the rectangular wave is higher than a resonance frequency of the resonant tank.

3. The DC/DC converter of claim 1, wherein when the state of the load is the heavy-load or the full-load, the control unit controls the rectangular wave generator in a frequency modulation mode.

4. The DC/DC converter of claim 1, wherein the control unit controls an on/off state of the switches to output the rectangular wave, wherein amplitude of the rectangular wave is equal to the input DC voltage or the double of the input voltage.

5. The DC/DC converter of claim 4, wherein the rectangular wave generator is a half-bridge circuit or a full-bridge circuit.

6. The DC/DC converter of claim 1, wherein the load comprises a resistor.

7. The DC/DC converter of claim 6, wherein the output circuit further comprises a transformer and a rectifier both electrically connected to the resistor.

8. The DC/DC converter of claim 1, wherein the resonant tank is a series resonant circuit or a parallel resonant circuit.

9. The DC/DC converter of claim 8, wherein the series resonant circuit is a LC series resonant circuit or a LLC series resonant circuit.

10. The DC/DC converter of claim 9, wherein the LLC series resonant circuit comprises a magnetizing inductor, a resonant inductor and a resonant capacitor connected to each other in series, wherein the magnetizing inductor and the output circuit are connected in parallel.

11. The DC/DC converter of claim 10, wherein the duty ratio is less than 0.5 and greater than a lower limit value of the predetermined range, so that when the resonant capacitor charges, the voltage gain of the DC/DC converter is greater than said another voltage gain under the condition of 50% duty ratio.

12. The DC/DC converter of claim 10, wherein the duty ratio is greater than 0.5 and less than an upper limit value of the predetermined range, so that when the resonant capacitor discharges, the voltage gain of the DC/DC converter is greater than said another voltage gain under the condition of 50% duty ratio.

13. A power converter comprising:
    a DC/DC converter of claim 1;
    a power factor correction device electrically coupled with the DC/DC converter; and
    an electromagnetic interference filter electrically coupled with the power factor correction device for receiving alternating current, wherein the electromagnetic interference filter and the power factor correction device convert the alternating current into the input voltage and provide the input voltage for the DC/DC converter.

14. The power converter of claim 13, wherein when the state of the load is the light-load or the no-load, the power factor correction device reduces the input voltage provided for the DC/DC converter.

15. The power converter of claim 13, wherein when the state of the load is the light-load or the no-load, the power factor correction device is turned off.

16. The power converter of claim 13, wherein the power factor correction device comprises:
    a bridge rectifier; and
    a power factor corrector electrically coupled with the bridge rectifier.

17. The power converter of claim 13, wherein the power factor correction device comprises a bridgeless power factor corrector.

18. A method of controlling the power converter, the method comprising:
- converting an input DC voltage into at least one rectangular wave by a rectangular wave generator comprising switches;
- providing a first voltage based on the rectangular wave for an output circuit;
- detecting a signal related to a state of the load; and
- when the state of the load is a light-load or a no-load, outputting control signals to the switches of the rectangular wave generator to control a duty ratio of the rectangular wave in a hiccup mode, so that the duty ratio of the rectangular wave is within a predetermined range, in which a voltage gain is greater than another voltage gain under the condition of 50% duty ratio for reduction in the on-off times of the switches of the rectangular wave generator per unit time.

19. The method of claim 18, further comprising:
- when the state of the load is the light-load or the no-load, controlling a working frequency of the rectangular wave to be higher than a resonance frequency.

20. The method of claim 18, further comprising:
- when the state of the load is the heavy-load or the full-load, modulating the rectangular wave in a frequency modulation mode.

21. The method of claim 18, wherein the step of transforming the input voltage into the rectangular wave comprises:
- controlling an on/off state of a switch to output the rectangular wave, wherein an amplitude of the rectangular wave is equal to the input voltage or the double of the input voltage.

22. The method of claim 18, further comprising:
- configuring an electromagnetic interference filter to receive alternating current, wherein the electromagnetic interference filter and a power factor correction device convert the alternating current into the input voltage and provide the input voltage for the output circuit.

23. The method of claim 22, further comprising:
- when the state of the load is the light-load or the no-load, reducing the input voltage provided from the power factor correction device.

24. The method of claim 22, further comprising:
- when the state of the load is the light-load or the no-load, turning off the power factor correction device.

* * * * *